(12) United States Patent
Masselli et al.

(10) Patent No.: US 9,075,455 B2
(45) Date of Patent: Jul. 7, 2015

(54) METHOD FOR DETERMINING THE RELATIVE POSITION OF AN OBJECT IN AN AREA, AND OPTICAL INPUT SYSTEM

(75) Inventors: Andreas Masselli, Tuebingen (DE); Karl Engelbert Wenzel, Dettenhausen (DE); Andreas Zell, Wannweil (DE)

(73) Assignee: Eberhard Karls Universitaet Tuebingen, Tuebingen (DE)

( * ) Notice: Subject to any disclaimer, the term of this patent is extended or adjusted under 35 U.S.C. 154(b) by 57 days.

(21) Appl. No.: 14/115,605

(22) PCT Filed: Apr. 24, 2012

(86) PCT No.: PCT/EP2012/057446
§ 371 (c)(1),
(2), (4) Date: Dec. 30, 2013

(87) PCT Pub. No.: WO2012/150147
PCT Pub. Date: Nov. 8, 2012

(65) Prior Publication Data
US 2014/0104169 A1 Apr. 17, 2014

(30) Foreign Application Priority Data
May 4, 2011 (DE) .......................... 10 2011 075 253

(51) Int. Cl.
*G06F 3/033* (2013.01)
*G01B 11/00* (2006.01)
*G01B 11/03* (2006.01)
*G06F 3/0346* (2013.01)
*G06T 7/00* (2006.01)

(52) U.S. Cl.
CPC ................ *G06F 3/033* (2013.01); *G01B 11/00* (2013.01); *G01B 11/03* (2013.01); *G06F 3/0346* (2013.01); *G06T 7/0042* (2013.01); *G06T 2207/10016* (2013.01); *G06T 2207/30204* (2013.01)

(58) Field of Classification Search
CPC combination set(s) only.
See application file for complete search history.

(56) References Cited

U.S. PATENT DOCUMENTS

| 6,417,836 B1 | 7/2002 | Kumar et al. | |
| 2007/0085823 A1* | 4/2007 | Adams | 345/156 |

(Continued)

FOREIGN PATENT DOCUMENTS

WO    WO 2004/114112 A1    12/2004

OTHER PUBLICATIONS

International Search Report, including English translation, dated Jul. 20, 2012 (6 pages).

(Continued)

*Primary Examiner* — Van Chow
(74) *Attorney, Agent, or Firm* — Crowell & Moring LLP (57) ABSTRACT

A method for determining the relative position of an object in an area in six spatial degrees of freedom is provided. A marker pattern with at least three markers is applied on the object, and an optical detecting device is provided with a two-dimensional sensor surface. The object is moved in the detection region of the optical detecting device such that the marker pattern can be detected by the detecting device, images of the markers are projected onto image positions on the sensor surface, and the image coordinates of the markers are ascertained. The relative position of the marker pattern is determined by analyzing the image coordinates. The position of an invariant point is ascertained on a reference circle on a reference plane, and describes a unique relationship between a coordinate system assigned to the marker pattern and a coordinate system assigned to the detecting device.

17 Claims, 7 Drawing Sheets

(56) References Cited

U.S. PATENT DOCUMENTS

| | | |
|---|---|---|
| 2008/0195343 A1* | 8/2008 | Osterlund et al. ............ 702/95 |
| 2009/0070065 A1 | 3/2009 | Seko et al. |
| 2009/0225024 A1* | 9/2009 | Fitzli et al. ................ 345/156 |
| 2011/0279476 A1* | 11/2011 | Nielsen et al. .............. 345/619 |

OTHER PUBLICATIONS

Wenzel et al., "Automatic Take Off, Tracking and Landing of a Miniature UAV on a Moving Carrier Vehicle," Journal of Intelligent and Robotic Systems; Theory and Applications—(Incorporating Mechatronic Systems Engineering), Kluwer Academic Publishers, Oct. 23, 2010, vol. 61, No. 1-4, pp. 221-238.

Fischler et al., "Random Sample Consensus : A Paradigm for Model Fitting with Applications to Image Analysis and Automated Cartography," Communications of the Association for Computing Machinery, ACM, New York, NY, US, Jun. 1, 1981, vol. 24, No. 6, pp. 381-395.

German Office Action dated Jan. 13, 2012 (Seven (7) pages).

Gebken, "Conformal Geometric Algebra in Stochastic Optimization Problems of 3D-Vision Applications", Institut fuer Informatik der Christian-Albrechts-Universitaet zu Kiel, Bericht Nr. 1001, pp. Title-IV, 1, 134-145, Feb. 2010—Zusammenfassung, Inhalt, Kapitel 4, (Twenty-four (24) pages).

* cited by examiner

METHOD FOR DETERMINING THE RELATIVE POSITION OF AN OBJECT IN AN AREA, AND OPTICAL INPUT SYSTEM

CROSS REFERENCE TO RELATED APPLICATIONS

This application is a National Stage of PCT International Application No. PCT/EP2012/057446, filed Apr. 24, 2012, which claims priority under 35 U.S.C. §119 from German Patent Application No. 10 2011 075 253.6, filed May 4, 2011, the entire disclosures of which are expressly incorporated by reference herein.

BACKGROUND

The invention relates to a method for determining the relative position of an object in space in six spatial degrees of freedom and to an optical input system for generating digital position data, which represent the relative position of the input device in space in six spatial degrees of freedom relative to an optical detection apparatus.

By way of example, optical input systems can be employed to control functions of connected terminals. By way of example, an actuatable terminal can be a personal computer (PC) or a games console or a television set or the like.

There are numerous input systems which can be used in conjunction with a computer in order to control functions of the computer. A conventional mouse, which can be moved by the user by hand on a planar pad and which communicates to a computer by means of a wire or wirelessly using a radio link, for example renders it possible to control the location of a computer-generated mouse pointer on the screen of the computer system. Different actions in the operating system or an application can be triggered by actuating a mouse button.

There are many applications where an input with more than two degrees of freedom is advantageous or required for the control thereof. By way of example, it is desirable for many computer games or graphics applications to have available an input system which enables the control of computer-generated objects in more than two dimensions, in particular in all six spatial degrees of freedom (6D input system). A 6D input system generally has a hand-held input device, which is held using one hand by a user and can both be moved in a translational manner in space and be pivoted or rotated in different directions. By using a 6D input system, it should be possible to determine both the location of the input device in space and the orientation of the input device in space with a speed and accuracy sufficient for the control object such that movements of the input device can be employed to control the terminal.

U.S. Pat. No. 6,417,836 B1 describes a method for determining the relative position of an input device in space in six spatial degrees of freedom. The input device has a grip, at the upper end of which a plate is applied, which carries a marking pattern with five luminous markings, arranged in coplanar fashion, in the form of LEDs. This input device is moved within the detection region of a camera in such a way that the markings are imaged or projected onto assigned image locations of the two-dimensional sensor surface of the camera. From the associated image coordinates, the relative position of the marking pattern is determined with the aid of a computer-numerical evaluation method. To this end, video signals from the camera are transmitted to a computer separate from the camera, the computational power of which computer is sufficient to perform the evaluation method. During the evaluation, a label is assigned to each of the markings in order to enable differentiation of the markings from one another. In one variant, this differentiation of the markings is achieved by virtue of the latter having different colors. In another variant, the labeling is achieved by virtue of the movement of images of the markings being tracked over a number of successive images. Another variant for identifying or labeling the markings employs geometric relationships between the five markings lying in a common plane.

Problem and Solution

It is an object of the invention to provide a method of the type described at the outset and a corresponding input system, which are able to operate using cost-effective components and enable quick and exact determination of the relative position of an object in space in six spatial degrees of freedom.

The inventors have identified that there is a fixed point B in the reference plane, with the aid of which it is possible to calculate the location of the projection center. The location of the fixed point describes a unique relationship between a coordinate system (represented by the third marking of the marking pattern, which is assigned to the foot $M_i'$) assigned to the pattern and a coordinate system (represented by the projection center $P_i$) assigned to the detection apparatus. Furthermore, it was identified that the location of the fixed point in the reference plane can be calculated proceeding from the images of the markings without the relative location of detection apparatus and marking pattern being known initially.

In the method, a reference circle is established, which extends through the first marking, the second marking and the projection center and has a center, with the location of the fixed point on the reference circle being established. As a result, a particularly fast, exact and robust or numerically stable evaluation is possible by employing rules relating to the circle geometry.

The method only requires three markings for an exact calculation of the position (location and orientation). These markings must form a triangular arrangement, i.e. they may not be arranged on a common straight line. The mutual distance between the markings should, depending on the spatial resolution of the sensor in the detection apparatus, be so large that, at typical work distances from the detection apparatus, the associated image locations on the sensor surface are reliably distinguishable. There are no further restrictions in respect of the arrangement of the markings. Furthermore, only a single optical detection apparatus is required.

Preferably only three markings are employed for an exact calculation of the relative position. In some embodiments of the input system the marking pattern accordingly has exactly three markings.

In respect of the properties thereof, e.g. in respect of color, shape and size, the markings can be substantially identical, simplifying the design.

The first, the second and the third marking preferably form an isosceles triangle, the base of which extends between the first and the second marking. The symmetric arrangement as an isosceles triangle simplifies and accelerates the evaluation, and so the computational requirements can once again be reduced. The base angles of the isosceles triangle preferably lie between 20° and 70°. If the base angles become significantly less than 20°, there is the risk of the angular resolution suffering when determining the orientation. In the case of base angles significantly over 70°, the risk increases that one marking can be covered by another marking from certain perspectives such that the visibility by the detection apparatus is no longer ensured.

In some embodiments, a fourth marking is also provided in addition to the first, second and third marking. Said fourth marking can be employed to make the evaluation even more robust since, with the aid of a fourth marking, it is possible to identify the actually present situation in the application situation from several initially possible solutions when searching for the exact solution to the problem of determining the position.

The fourth marking preferably lies in line with the first and the second marking. As a result, the assignment of the images of the markings to the associated markings can be simplified and accelerated during the evaluation. The fourth marking can lie between the first and the second marking, or it can lie outside of the path connecting the first and the second marking. It may be expedient for the markings lying collinearly with one another (first, second and fourth marking) not to have the same distance from one another, i.e. to be non-uniformly distributed along the line. As a result, identification can be made even easier.

When selecting the image locations used for the evaluation, a sort step for the assignment between the image locations, present on the sensor surface, and the associated markings of the marking pattern is preferably performed. Different variants can be employed, depending on the application. A sort method from the following group is preferably selected: (i) sort along at least one predetermined image direction; (ii) sort by movement tracking; (iii) permutation of possible assignments and identification of the correct assignment by checking the plausibility; and (iv) employment of an additional fourth marking.

Performing this evaluation method only requires relatively low computational power. Therefore provision is made in some embodiments for the evaluation method to be performed in a computer unit assigned to the detection apparatus and for the computer unit to transmit digital position data, representing the position of the object, to a processing unit of the terminal for further processing purposes. As a result, it is not necessary to install evaluation software for performing the method in or on the terminal, and so a resource-sparing operation is possible on the terminal. Moreover, there is, inter alia, increased system stability because e.g. determining the position cannot be adversely affected by high system utilization on the terminal. Furthermore, the result of this is high flexibility of the input system since the latter can operate independently of the platform in respect of the terminal.

The invention also relates to an optical input system for generating digital position data, which represent the relative position of the input device in space in six spatial degrees of freedom relative to an optical detection apparatus. The input system comprises a hand-held input device, on which a marking pattern with a first marking, a second marking and a third marking (M) is applied, and an optical detection apparatus with a two-dimensional sensor surface and a projection optical unit, which, in relation to the sensor surface, is arranged in such a way that image information from a detection region of the detection apparatus can be projected onto the sensor surface. Furthermore, provision is made for a computer unit for determining the digital position data.

In accordance with one phrasing of the invention, the detection system is characterized in that the computer unit is configured to perform the evaluation method claimed in this application as an invention.

In accordance with another phrasing, the detection system is characterized in that it has exactly one detection apparatus, e.g. exactly one camera, and in that the marking pattern has exactly three markings or exactly four markings. This combination of features is possible in combination with the evaluation method in particular, but optionally also independently thereof.

The method and the input system are suitable for determining the relative position of an object in space in six spatial degrees of freedom (6D applications). If necessary, this can naturally also be used to determine the relative position in less than six degrees of freedom, e.g. only in a plane (2 degrees of freedom, 2D applications).

These and further features emerge not only from the claims but also from the description and the drawings, wherein the individual features can be realized in each case by themselves or as a plurality in the form of sub-combinations in an embodiment of the invention and in other fields and can constitute advantageous and inherently protectable embodiments. Exemplary embodiments are illustrated in the drawings and are explained in greater detail below.

DETAILED DESCRIPTION OF PREFERRED EMBODIMENTS

Figure 1:
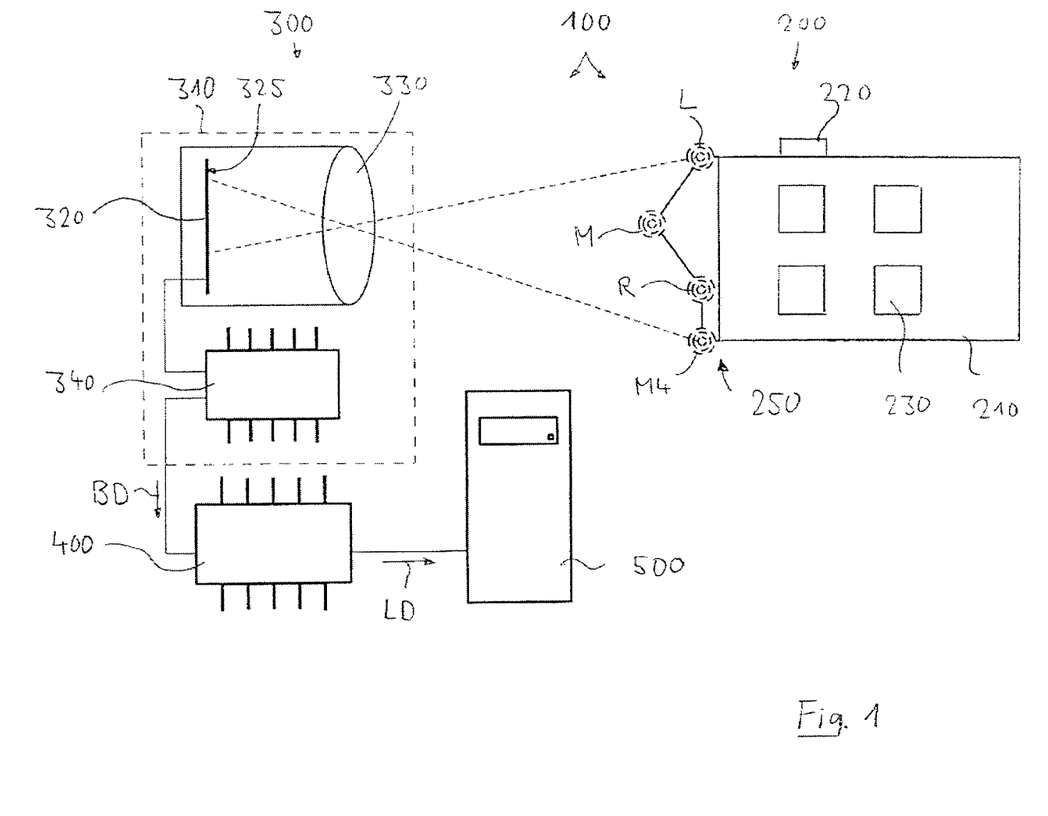
FIG. 1 shows a schematic overview illustration of an embodiment of an optical input system for controlling a terminal.

FIG. 1 shows a schematic overview illustration of an embodiment of an input system 100, which is provided for controlling functions of a terminal. The terminal (not illustrated) is equipped with a processing unit 500 for digital processing of the digital position data supplied by the input system, i.e. it is not part of the input system in this configuration.

The input system 100 includes a hand-held, freely movable input device 200, which comprises a holding section 210 which is comfortable to be held by hand, with a marking pattern 250 being applied to a front side of the input device outside of the holding section. The marking pattern 250 has three markings arranged in a triangular arrangement, namely a first marking L, a second marking R and a third marking M. These markings L, R and M form an isosceles triangle, with the base extending between the first and the second marking being approximately 10% to 50% longer than the limbs of equal length between the third and the first and also the third and the second marking. The base angles of the triangle (interior angle at the markings L and R) are each approximately 37° in this case.

Provision is additionally made for an optional fourth marking M4, which is not necessary for the function, but useful in certain situations, and arranged in line with the first and the second marking, i.e. along the extension of the base of the isosceles triangle L-M-R. The distance R-M4 between the second marking R and the fourth marking M4 is less than the distance between the first and the second marking, and so the markings L, R and M4, lying on a common line, are distributed non-uniformly along this line. The fourth marking simplifies the identification of the markings as first, second, third and fourth marking.

The geometry of the marking pattern (angles, distances) is predetermined and known to the system.

Each one of the quasi-punctiform markings is designed as an actively luminous, luminous marking and is formed by a single light-emitting diode (LED) which, when activated, emits light from the infrared spectrum (IR). Installed in the housing of the terminal is a line-independent electric power supply (battery or rechargeable battery), to which the LEDs are connected. With the aid of a switch 220 applied to the housing, the light-emitting diodes can be switched on or off when required. Further actuation elements 230 in the form of pushbuttons, switches and/or other touch-sensitive elements can be provided on the input device in order to enable additional control functions.

Wired variants of input devices are also possible. These then do not require an independent power supply.

In this exemplary embodiment, the markings L, R and M (and M4) are auto-luminous luminous markings. However, this is not mandatory. Within the scope of this application, the term "marking" should also comprise passive markings, onto which an external light source can shine or which can be excited by said external light source and as a result become "visible" to the detection unit of the input system. By way of example, markings can be formed by (passive), e.g. spherical retro-reflectors or the like. Markings can also be formed by dark crosses or other symbols on a bright background (or vice versa). An individual marking can also be formed by a group of two or more punctiform light sources, which lie so close together that they appear as a single, uniform marking to the distant detection apparatus. An essential feature of a marking is that, during operation of the detection system, it generates a clearly identifiable and localizable image on an assigned image location on the sensor surface when the marking pattern is visibly situated in the detection region.

The input system furthermore comprises an optical detection apparatus 300, which has a camera module 310 in the exemplary embodiment. The optical detection apparatus comprises a spatially resolving image sensor 320, for example equipped with a CCD chip or CMOS chip, with a two-dimensional sensor surface 325 and a projection optical unit 330 which, in relation to the sensor surface, is arranged such that image information from a three-dimensional detection region of the detection apparatus can be projected onto the sensor surface.

Integrated into the camera module is an image-data establishing unit 340 which is connected to the sensor 320 and converts the electrical image signals provided by the sensor 320 into image data BD that can be processed further digitally. To this end, an appropriately programmed semiconductor component can be provided in the camera module. In the exemplary case, the image data BD supplied by the camera module represent the image coordinates of the images of the three markings, which are generated with the aid of the projection optical unit 330 on the sensor surface 325 when the markings are situated in the detection region of the camera and visibly face the latter. Hence the camera module 310 not only records images but also establishes, in the style of an intelligent camera, the image coordinates of the projected markings or corresponding image data.

The digital image data BD are transmitted to a microcontroller 400, which can be arranged separately from the camera module or integrated together with the camera module in a unit. The spatial position of the camera module 310 relative to the marking pattern 250 is determined on or in the microcontroller solely on the basis of the image data BD or image coordinates supplied by the camera module. To this end, an evaluation method, which will still be explained below, is implemented, which initially determines the relative location and subsequently the orientation of the camera module relative to the marking pattern 250. The relative location and orientation of the marking pattern or of the input device 200 relative to the camera module 310 then also emerges automatically by means of a coordinate transformation.

The microcontroller 400 supplies corresponding digital processable position data LD to the processing unit 500. These position data contain spatial position data, which can, for example, be available as location coordinates x, y and z in a Cartesian coordinate system, and orientation data, which can, for example, be available in the form of data representing a 3×3 rotation matrix.

Other characterizations of the relative orientation, for example with the aid of three rotational angles (roll/pitch/yaw, Euler angle, etc.) are also possible.

The image-data establishing unit 340 and the microcontroller 400 in an exemplary manner represent a first computer unit and, separate therefrom, a second computer unit, which computer units can perform the above-described functions. The two calculation operations (generating the image data BD from the signals from the sensor and generating the position data LD from the image data BD) can also be performed by an individual computer unit of the detection system configured accordingly, for example by an appropriately configured FGPA (field programmable gate array).

In many conventional applications, the distance between the detection apparatus 300 and the marking pattern 250 will be between approximately 0.5 m and approximately 6 m during use, sometimes also above or below these values. In such cases, the markings often have typical distances from one another in the region of one or more centimeters, for example between 10 mm and 100 mm, in particular between 20 mm and 60 mm.

In the following text, FIGS. 2 to 5 are used to describe the mathematical background of an embodiment of the evaluation method.

In the art, the problem of calculating the relative position (location and orientation) in space of a camera on the basis of a group of markings is known as a perspective N-point problem. By way of example, an instructive illustration can be found in the article: "Random Sample Consensus: A Paradigm for Model Fitting with Applications to Image Analysis and Automated Cartography" by M. A. Fischler and R. C. Bolles in Commun. ACM, 24(6), pages 381-395 (1981). When considering the three-dimensional problem, this is also referred to as the perspective 3-point problem, also abbreviated to the P3P problem. Fischler et al. treat the P3P problem using the cosine laws. The proposed solution approach is based on the calculation of the ratios of lengths of the vectors leading to the markings, which can be considered to be edges of a tetrahedron. There can be, inter alia, singularities due to division by very small numerical values in the computationally complex calculation, as result of which the risk of numerical instability is created.

By contrast, the solution to this problem developed by the inventors is very robust, is based upon a relatively stripped-down mathematical formalism and, as result of this, is efficient enough to be implemented with high speed even on a relatively low-performance microcontroller. In contrast to a conventional solution approach (see e.g. the article "Automatic Take Off, Tracking and Landing of a Miniature UAV on a Moving Carrier Vehicle" by K. E. Wenzel, A. Masselli and A. Zell in Journal of Intelligent & Robotic Systems, 61, pages 221-238 (2010)), this solution is not based on estimates, the exactness of which has to be checked by check calculations using further markings. Rather, an exact solution to the problem is found systematically, with, in principle, only three non-collinear markings being required for determining the position exactly.

What follows is the illustration of how to derive a preferred variant of the solution.

In the figures, the letters L (left), M (center ["Mitte"]) and R (right) denote the positions of the first marking L, the second marking R and the third marking M of the marking pattern in space. This label is selected purely for reasons of clarity and should not restrict the general validity of the approach. The projections or images of these markings being created in the image plane IM of the camera at the point of the sensor surface 325 or the image locations associated with the markings are correspondingly denoted by $L_i$, $R_i$ and $M_i$, with the index "i" here denoting "image" for reasons of clarity. The image locations emerge by the projection of the markings by means of the projection optical unit. The projection center of this projection is denoted by $P_i$, corresponds to the origin of the camera and defines the reference point of the camera coordinate system KKS, which is employed for determining the location of the pattern.

A right-hand auxiliary coordinate system HKS, which will be explained below, has its origin in the center of the path L-R between the first and the second marking, with the y-axis pointing in the direction of the second marking R and the x-axis thereof lying in a reference plane E which will still be explained below. The auxiliary coordinate system is linked to the marking pattern.

The notation ∠(A,B) represents the angle between vectors $\vec{A}$ and $\vec{B}$, which can be calculated by:

$$\arccos\left(\frac{A \cdot B}{|A| \cdot |B|}\right).$$

Figure 2:
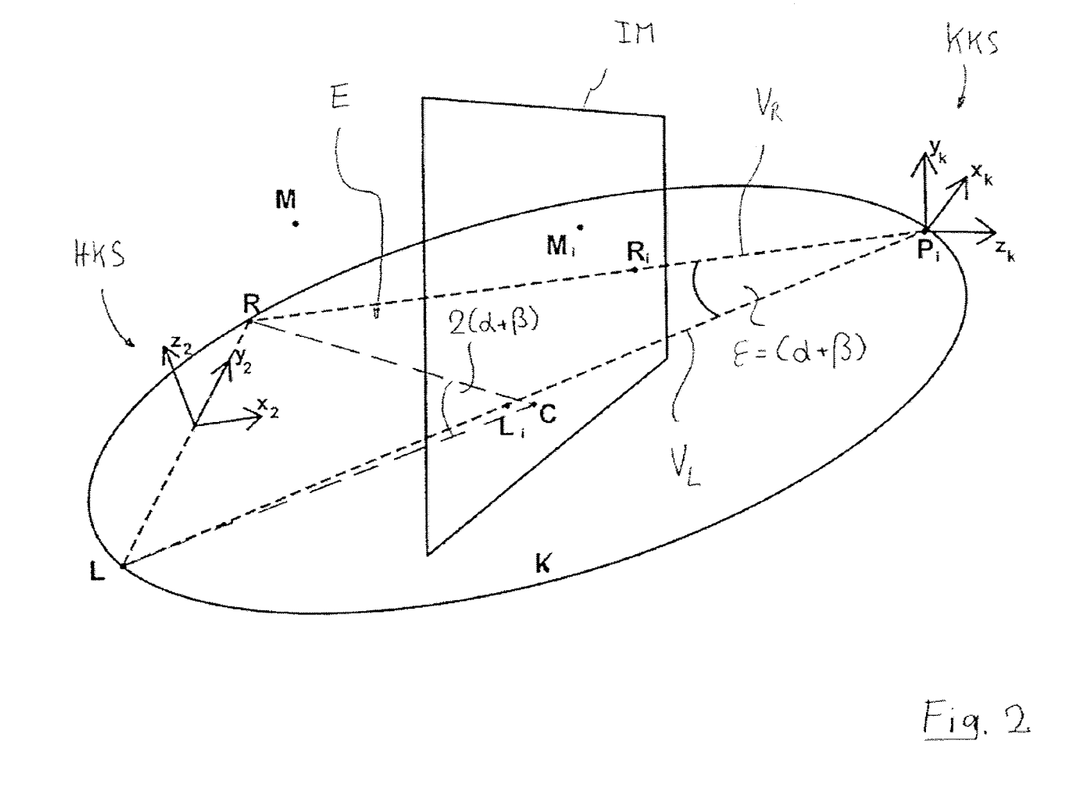
FIGS. 2 to 5 show schematic illustrations for explaining the mathematical background of one embodiment of the evaluation method.

Hence, three markings L, R and M and the images $L_i$, $R_i$ and $M_i$ thereof are given on a two-dimensional sensor surface IM.

Firstly there is a sort step for the assignment of the images or image locations detected on the sensor surface to the associated (real) markings. Hence, the first, the second and the third marking are identified or selected by means of the sort step. After completing the sort step, it is known which pixel of the pixel group situated on the sensor surface corresponds to the first, second and third marking. There are different options for the sort, inter alia the following:

(i) Sort along at least one predetermined image direction. During a sort in the X-direction of the image field (from left to right), the left-most pixel is, for example, assigned to the first marking, the pixel following this in the X-direction is assigned to the third marking, etc. Alternatively, or in addition thereto, there can also be a sort in the Y-direction.

(ii) Sort by movement tracking, where movements of images of the markings are tracked over several successive images.

(iii) Permutation of possible assignments and identification of the correct assignment by checking the plausibility. In the case of only three markings, there are only 6 possible assignments. These can all be calculated. The correct assignment is identified by a plausibility check.

(iv) Additional fourth marking: in the case of four markings, the marking pattern can be constructed in such a way that the assignment in many cases can be direct and unique without movement tracking, permutations or sort according to image direction. Here, the fourth marking preferably lies on a line with the first (left-hand) and the second (right-hand) marking. Unequal distances between these markings simplify the sort.

If required, several of these variants can also be combined.

Now, a reference plane E, which is defined by the points $L_i$, $R_i$ and $P_i$, is constructed by calculation. Here, a first vector $V_L$ between the projection center and the first image location $L_i$ and a second vector $V_R$ between the projection center and the second image location $R_i$ include a first angle $\epsilon=(\alpha+\beta)$ and span the reference plane E. The triangle $P_i$-L-R, denoted by short dashes, shows the position of the reference plane E which, due to the projection, also extends through the first and second marking (L and R).

The first angle $\epsilon=\angle(L_i, R_i)$ can be calculated with knowledge in relation to the focal length f of the camera and is therefore a variable that can be determined directly from the image coordinates of $L_i$ and $R_i$.

A next computational operation establishes a reference circle K, which extends through the first marking L, the second marking R and the projection center $P_i$, and has a center C. To this end, the extension to Thales' theorem (the inscribed angle theorem) or the theorem of inscribed angles is employed. In one wording, said theorem says that the central angle of a circular arc is twice as large as one of the associated angles at the circumference. The angle at the circumference lying at $P_i$ is the known first angle $\epsilon=(\alpha+\beta)$. Clearly the center C of the reference circle then lies at the point of the vertex of an isosceles triangle through L, R and C, wherein the vertex angle at the vertex C is twice the first angle, i.e. $2\epsilon$ or $2(\alpha+\beta)$.

Expressed in coordinates of the auxiliary coordinate system HKS, the inscribed angle theorem states that $P_i$ lies on a circle K with the center $$C = \left(\frac{y_R}{\tan(\varepsilon)}, 0\right),$$

where $Y_R$ is the y-coordinate of R in the auxiliary coordinate system. As a result of the expedient definition of the auxiliary coordinate system, the x-axis thereof passes through C, and so the y-coordinate of the center C equals zero.

Figure 3:
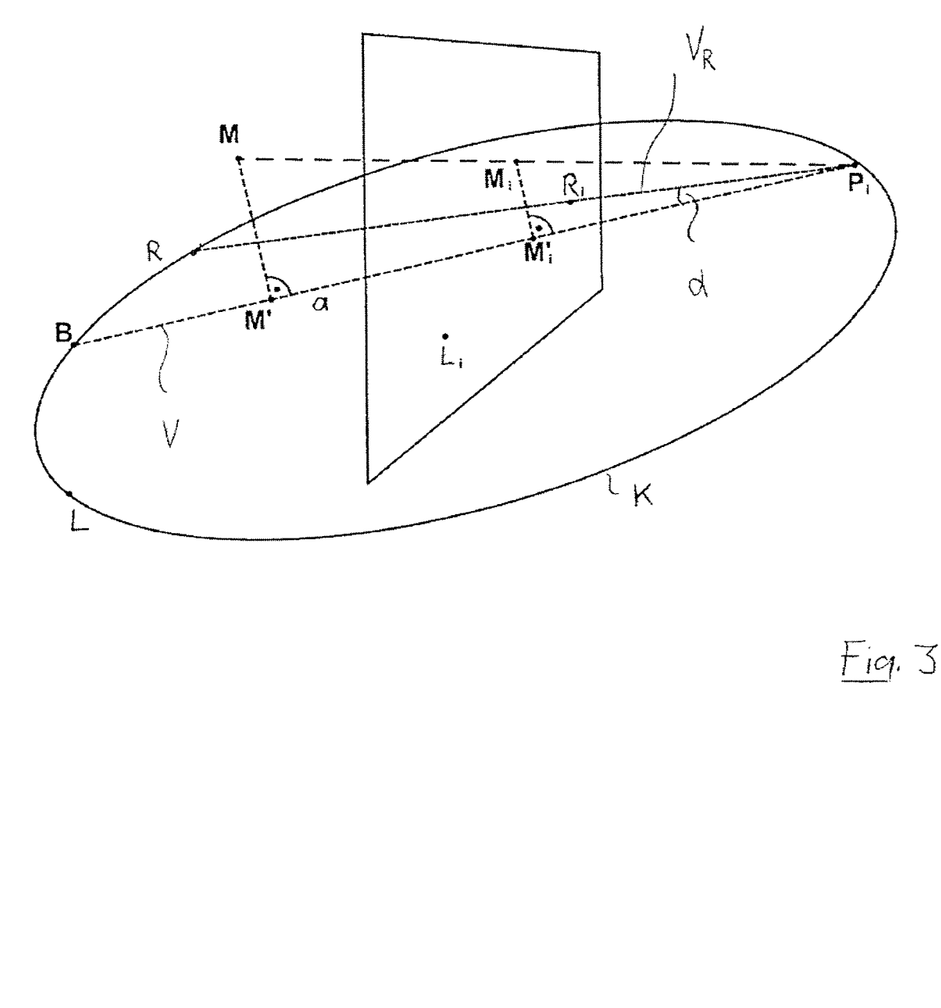

In conjunction with FIG. 3, the explanation now focuses on how the information in relation to the third marking M is employed, to which the third image location $M_i$ is assigned on the sensor surface. A perpendicular projection of the third image location $M_i$, associated with the third marking M, on the reference plane E defines a foot $M_i'$ of the third image location. By dropping the perpendicular from the third marking M onto the reference plane E, the foot M' of said marking is obtained in a similar fashion. Since the feet M' and $M_i'$ are linked by projection, a connecting straight line V, depicted by a dashed line, extends through the projection center.

This connecting straight line V divides the first angle $\epsilon=(\alpha+\beta)$, present at $P_i$, into two sub-angles $\alpha$ and $\beta$, wherein $\alpha$ is the angle between the second vector $V_R$ and the connecting straight line V and the angle $\beta$ (not illustrated) is the remaining angle, i.e. the angle between the first vector $V_L$ and the connecting straight line V. Hence, with the aid of M or $M_i$, it is possible to determine the angle $\alpha=\angle(M_i', R_i)$, with the aid of which it is possible to determine the fixed point B, which likewise lies on K.

Figure 4:
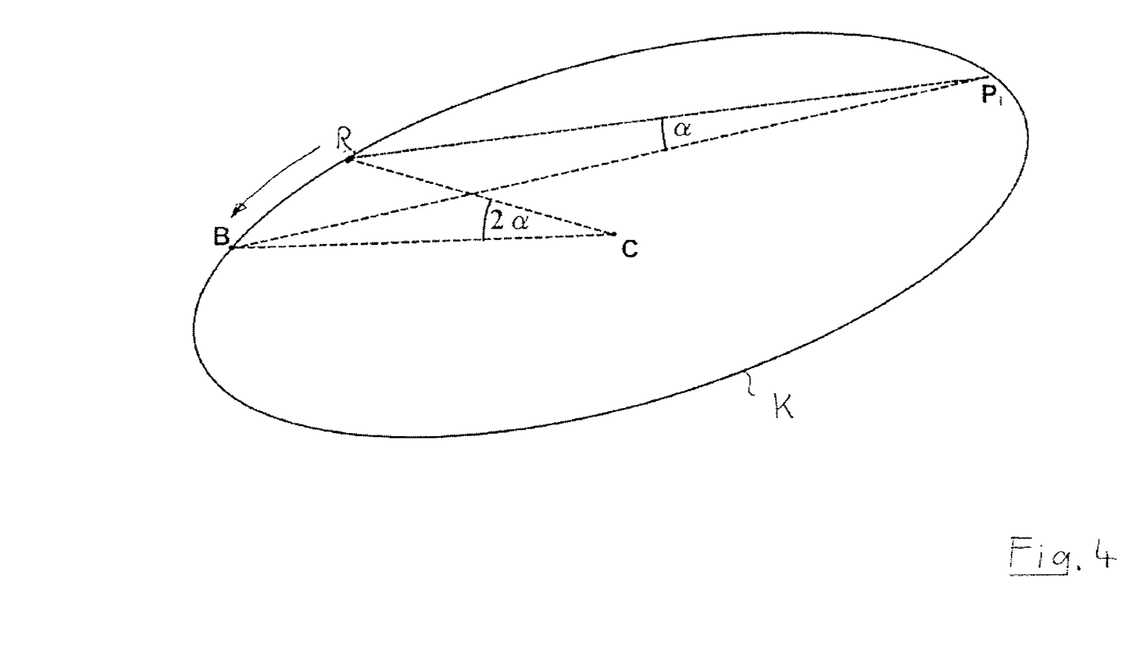

If the magnitude of sub-angle α is known, the location of B can be established by a further application of the inscribed angle theorem (cf. FIG. 4). Associated with the angle at the circumference α is the central angle 2α, which is twice the size. Proceeding from the location of the second marking R, it is possible to determine the location of B by rotation of the point R about C (see arrow) by 2α.

The fixed point B inter alia has the property that it lies on the reference circle K and that it forms the point of intersection between the connecting straight line V between $P_i$ and $M_i'$ and the reference circle.

B is constant for all possible positions of $P_i$ on the reference circle K, which is why B is referred to as fixed point.

There is a functional relationship between the locations of the foot $M_i'$ and the projection center $P_i$, which can be determined on the basis of geometric relationships. P can also be established as a function of the coordinate $x_{M'}$ (x-coordinate of M' in the HKS) since the associated y-coordinate $y_{M'}$ is constant. As a result of selecting the symmetrical marking pattern (isosceles triangle), the calculation can be simplified since in this case the y-coordinate $y_{M'}$ is zero. In this formulation, the problem consists of determining the value of $x_{M'}$. The following will explain one solution.

Figure 5:
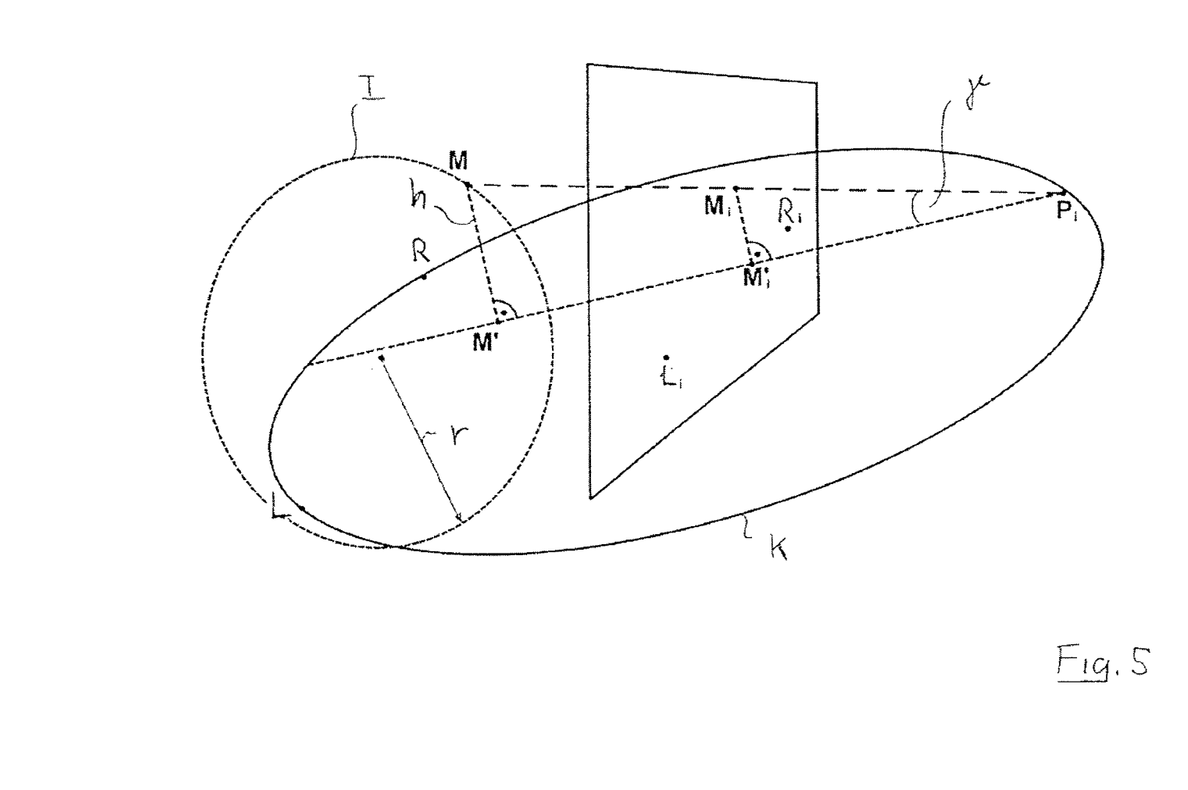

In order to fix the location of $P_i$ on the reference circle K and hence also to fix the position of M' on the connecting straight line V, the procedure outlined below can be adopted (cf. FIG. 5).

The third marking M lies in a circle I, the radius r of which is known as a result of the geometric construction of the marking pattern (r is the height of the triangle L-R-M with base L-R). As a result, it is possible to describe P as a function of M'. Initially, the distance h from M to E is considered, i.e. the height of M over the reference plane E. Since M lies on I, the following applies:

$$h = d(M,E) = d(M,M') = \sqrt{r^2 - {x'_M}^2}.$$

The height h can also be determined with the aid of the angle $\gamma = \angle(M'_i, M_i)$ and the distance a between $P_i$ and M'. In this case, γ is the angle of inclination of the line $P_i$-M over the reference plane E at the point of the projection center $P_i$:

$$h = a \cdot \tan(\gamma).$$

Hence, the following applies:

$$\sqrt{r^2 - {x'_M}^2} = a \cdot \tan(\gamma).$$

By squaring and performing an expansion, what emerges is the fourth degree polynomial:

$$ax^4 + bx^3 + cx^2 + dx + e = 0$$

Using the gradient $m = \tan(\gamma)$ and the simplification $x = x'_M - x_C$, the following coefficients apply:

$$a = m^2 + 1$$

$$b = 2(x_C - x_B)$$

$$c = v + (1 - 2x_C^2)B^2 - 4x_C x_B$$

$$d = 2(x_C B^2 - v x_B)$$

$$e = vB^2 + m^2(B^2)^2$$

where $v = x_C^2 - r^2$ and $B^2 = x_B^2 + y_B^2$.

Here, the variables $x_C$, $x_C$ in each case denote the x-coordinate of the corresponding point B or C, etc., in the auxiliary coordinate system HKS.

The polynomial has four possible solutions, which correspond to the four zeros. The solution fitting to the application situation, i.e. the correct zero, emerges as explained in the following.

Since the assumption can be made that the marking pattern points in the direction of the camera (if this were not the case, then not all markings would be "visible"), the actual solution is the one with the smallest distance from M to P and hence the greatest absolute value of the zero of the polynomial. This value is found by four-fold iteration according to the Newton method, with the initial point being $x_0 = r - x_C$.

Once the correct zero has been found, the location of $P_i$ can be calculated as point of intersection of the connecting straight line V through B and M' and the reference circle K. From this, the location of the camera (detection apparatus) initially emerges in the auxiliary coordinate system associated with the marking pattern. A coordinate transformation then provides the sought-after location of the marking pattern in camera coordinates.

A more general solution, which also applies to non-isosceles triangles, is based on the same approach and can be derived when applying the principles described above. For reasons of clarity, a detailed illustration is dispensed with.

Proceeding from the relative location, the relative orientation can in principle be established with the aid of methods known per se. In the following text, a preferred variant, developed by the inventors, which operates using rotational matrices, is illustrated. Here, reference is made to FIG. 2.

As a reminder: the parameter P, describes the location of the projection center in the camera coordinate system KKS and is defined in such a way that $P_i$ is the origin of the camera coordinate system. The corresponding parameter P describes the projection center in a pattern coordinate system assigned to the marking pattern. In order to determine the orientation of the camera (detection apparatus), a 3×3 rotation matrix is made as follows: two vectors $W_L = \overrightarrow{PL}$ and $W_R = \overrightarrow{PR}$ are calculated with knowledge of the location of P. In general, these vectors are not collinear with the first vector $V_L$ and the second vector $V_R$, but can be converted into or made congruent with these by rotation. The corresponding rotation matrix is composed by performing two rotations in succession such that the first vector $V_L$ (FIG. 2) initially extends collinearly with $W_L$ and that subsequently the second vector $V_R$ is also collinear to $W_R$. FIG. 2 makes it clear that this has to be the case as a result of the model. Here, the notation Rot(a, ω) represents a 3×3 rotation matrix, which describes a rotation about the axis a by the angle ω. In the following brief illustration of computational operations, the symbol "·" (scalar product) represents the application of a matrix to a vector or a matrix and the symbol "×" represents the cross product of two vectors.

$$a1 = V_L \times W_L$$

$$\delta 1 = \angle(V_L, W_L)$$

$$Rot1 = Rot(a1, \delta 1)$$

$$VR' = Rot1 \cdot V_R$$

$$n1 = W_L \times V_R'$$

$$n2 = W_L \times W_R$$

$$a2 = n1 \times n2, \delta 2 = \angle(n1, n2)$$

$$Rot2 = Rot(a2, \delta 2)$$

$$Rot = Rot2 \cdot Rot1$$

Hence the orientation of the camera is uniquely determined by the matrix Rot. Hence, together with P, the relative position, i.e. the positional relationship between camera coordinate system and pattern coordinate system, is uniquely determined. The relative position can be described by a transformation matrix.

The method can be realized using cost-effective components. During experiments for checking the functional capability of the method, a first model helicopter ("leader") was equipped with a marking pattern with four luminous markings with IR-LEDs. This helicopter served as an object, the relative position (location and orientation) of which was to be determined in space. A second model helicopter ("follower") was equipped with a camera module, which contained an IR camera as an optical detection unit with a two-dimensional sensor surface. In this "follow the leader" scenario, the following second helicopter was to follow the leading first helicopter at a constant distance of 2 m, wherein the control of the movements of the following (second) helicopter was performed on the basis of position data established with the aid of the method.

The camera unit of a Wii remote (abbreviated Wiimote) from the games console by the Japanese company Nintendo was used as a camera module. When the camera is directed to the marking pattern, the images of the luminous markings become apparent as four bright regions. The camera module already determines the 2D image coordinates of these regions and outputs these in pixel coordinates. A resolution of 1024× 768 pixels, which was achieved by 8-fold sub-pixel analysis, was sufficient for the problem.

Furthermore, a specially programmed microcontroller connected to the camera module was provided in the following second model helicopter, on which microcontroller the calculations of the evaluation method, i.e. the conversion of image data into position data, was performed. The microcontroller was used to determine the spatial position of the camera relative to the marking pattern solely on the basis of the image coordinates. The second helicopter was controlled on the basis of these position data.

The trials showed that the following helicopter could, with small deviations, follow the leading helicopter during the movement thereof in the case of all movements. These trials showed that low latency times and high repetition rates are possible with the aid of the evaluation method, even in the case of an implementation on a simple computer unit such as a microcontroller.

The basic principle can also be employed in an input system, in which the object consists of, with the aid of a camera or another optical detection apparatus, determining the relative position in space of an input device provided with a marking pattern with little latency and hence practically in real time. As a result of the direct calculation on a microcontroller, no calculations for determining the position are required on the terminal to be controlled, and so a reduced data flow emerges there.

Embodiments of the input system can be employed for different purposes, of which some are explained in an exemplary manner in the following text.

Figures 6A, 6B:
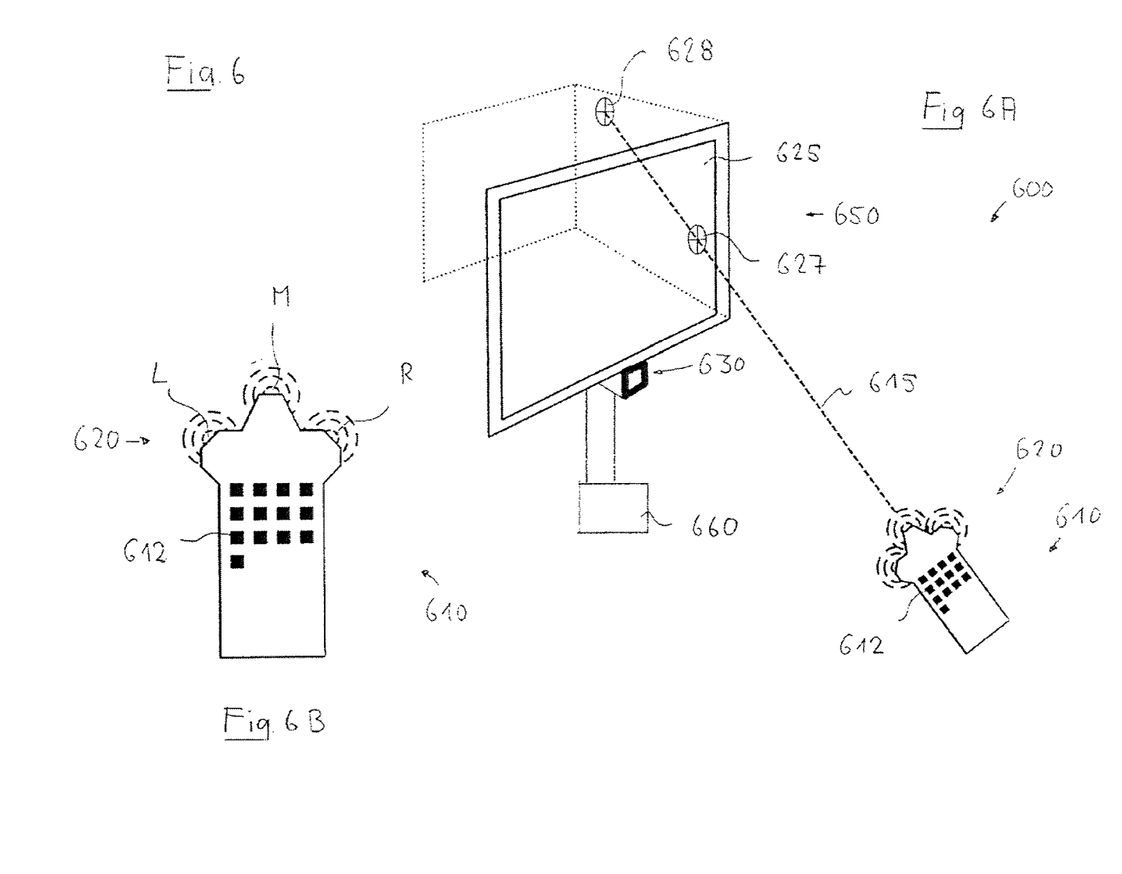
FIG. 6 shows an overview illustration in 6A and an input device of an input system for controlling a television set in 6B.

FIG. 6A shows a schematic overview illustration about the use of an embodiment of an input system 600 for controlling the function of a television set 650. The television set 650 is an example of a terminal, with a screen, which can be controlled with the aid of the input system. Modern television sets are distinguished by ever more complex functions and, accordingly, ever more complex menus for selecting and controlling the functions. In the exemplary case, the input system is employed to determine the location of a 2D cursor 627 on the screen 625 of the television set 650 and to move the cursor over the screen. To the extent that this is a television set with the option of a three-dimensional display (3D television set), it is also possible to move a corresponding 3D cursor 628 in a virtual three-dimensional space, which is indicated by the dashed lines.

The input system 600 includes a handheld input device 610, which is illustrated in a magnified manner in FIG. 6B, can move freely in space, substantially has a design like a conventional wireless remote control and has a number of pushbuttons 612 on the top side of the housing thereof for the purposes of conventional operation of the television set (e.g. program selection, volume, etc.). A user is used to pointing a remote control in the direction of the television set 650 in order to operate the television set. The front side of the input device thus normally points in the direction of the screen of the television set during use.

Applied to the front side of the input device is a marking pattern 620 with exactly three markings (first marking L, second marking R and third marking M), which are in each case formed by infrared light-emitting diodes (IR-LEDs). It can clearly be seen in the detailed illustration of FIG. 6B that the front section of the remote control adjoining the holding section has a design in the shape of a cross, wherein the first marking L is arranged on one arm of the cross, the second marking R is arranged on the opposite arm of the cross and the central marking M is arranged on the tip of the cross projecting towards the television set. The markings form an isosceles triangle, with the path L-R as a base, which is longer than the limbs leading to the third marking M. The light-emitting diodes are switched on and off together by means of a separate switch. It is also possible for the markings to be switched on automatically when the remote control is moved by the user. To this end, a movement sensor can be integrated into the remote control.

Provided as a further component of the input system 600 is an infrared camera 630, which in the exemplary case is fixedly installed underneath the screen 625 on the television set with a viewing direction toward the user. The electro-optical components of the camera are part of a camera module which, in addition to the projection optical unit and the two-dimensional sensor, also has one or more integrated computer units, which, from the image locations of the markings detected by the camera, transmit digitally processable position data to a connected processing unit 660 of the television set. The position data from the image locations associated with the markings L, R and M detected by the camera are established in accordance with the evaluation method explained above or in accordance with a method having an equivalent result.

Only a single detection apparatus or camera is required and accordingly provided. It need not necessarily be arranged underneath the screen, but it can also be seated above or to the side of the screen. The location of the detection apparatus merely needs to be known or be determinable by calibration or the like.

The processing unit 660 is part of the control apparatus of the television set, which controls the screen display. Thus, it is possible to control the location of the 2D cursor 627 and/or of the 3D cursor 268 on the basis of the position data supplied by the camera module. This provides a very intuitive option for operation, wherein the location of the cursor appears fixedly coupled to the position and orientation of the input device 610 via a virtual beam 615.

For this optical option for control, no radio link is required between remote control (input device) 610 and the television set. The control takes place virtually without delay since the computational power of the computer units of the camera module is sufficient to establish the position data quickly and precisely, virtually in real time, and transmit these to the processing unit 660.

In order to expand the options of use of the television set with the aid of the input system, all that is required is to attach the camera module of the input system 600 in a spatially secured manner in relation to the screen 625 of the television set and connect it to the control of the television set. The position data can be provided processed by the camera module in such a way that they can be converted directly into control signals for the screen display by the processing unit 660 of the television set. All that may be required to retrofit the remote control is to apply the three markings for the marking pattern with the correct geometric arrangement on the front side of the remote control.

However, conventionally a remote control (or another input device) already equipped with markings is made available as a component set (kit) or as sales unit in conjunction with the camera module.

The additional possible degrees of freedom of the virtual 3D cursor 628 also permit complex manipulations in the control menu or in a 2D or 3D video game installed on the television set.

For the basic functions of the input system 600, no additional components are required on the input device 610 except for the markings of the marking pattern 620. In particular, the input device of this optical input system neither has nor requires an integrated camera or any devices for establishing a radio link to the terminal to be controlled.

However, in some embodiments, at least one sensor is provided in addition to the marking pattern and it permits additional information to be supplied in respect of the position, orientation and/or the movement state of the input device.

By way of example, at least one accelerometer can be provided. Optionally, provision can be made for three accelerometers arranged orthogonal to one another in order to establish linear accelerations in three spatial directions, from which translational movements can be calculated.

Alternatively, or in addition thereto, provision can be made for at least one rate-of-rotation sensor in order to detect the angular velocity of a movement about a defined rotational axis. Three orthogonally arranged rate-of-rotation sensors can be provided in order to establish the angular velocities in relation to three spatial directions, from which it is then possible to calculate the rotational movements.

Alternatively, or in addition thereto, provision can be made for a magnetic field sensor, which, in the style of a compass sensor, renders it possible to establish the orientation of the input device relative to the Earth's magnetic field. In combination with accelerometers and rate-of-rotation sensors, an inertial measurement unit, which can be integrated into the input device, can be constructed with the aid of such sensors. As a result of this, it is also possible to control, in a manner close to reality, complex video games and other applications with 2D or 3D graphics.

In the case of at least one additional sensor in the input device, provision is made for a transmission of the information detected by the sensor to the terminal to be controlled. By way of example, a wireless transmission can be performed using an integrated radio transmission module. It would also be possible to modulate the radiation emitted by the auto-luminous markings in order in this manner to enable optical information transmission from the sensors to the terminal.

So that the marking of the marking pattern can be detected by the detection apparatus with a sufficient spatial resolution, the markings should have a minimum distance from one another, adapted to the typical work distance, such that the images thereof on the sensor surface can clearly be separated from one another. On the other hand, the spatially extensive marking pattern is optionally not required in all types of use of a terminal. Therefore provision is made in some embodiments for the input device to have a holding section and for at least one marking support, which can move in relation to the holding section and can be moved between a neutral position and a functional position, to be attached to the input device, with the marking carried by the marking support having the correct relative location to the other markings of the marking pattern in the functional position. By way of example, the marking support can be attached in a pivotable manner on the holding section. Alternatively, a linearly displaceable marking support or a combination of pivotable and linearly displaceable marking supports would also be possible. Exemplary embodiments will be explained on the basis of FIGS. 7 to 9.

Figures 7, 8, 9, 10:
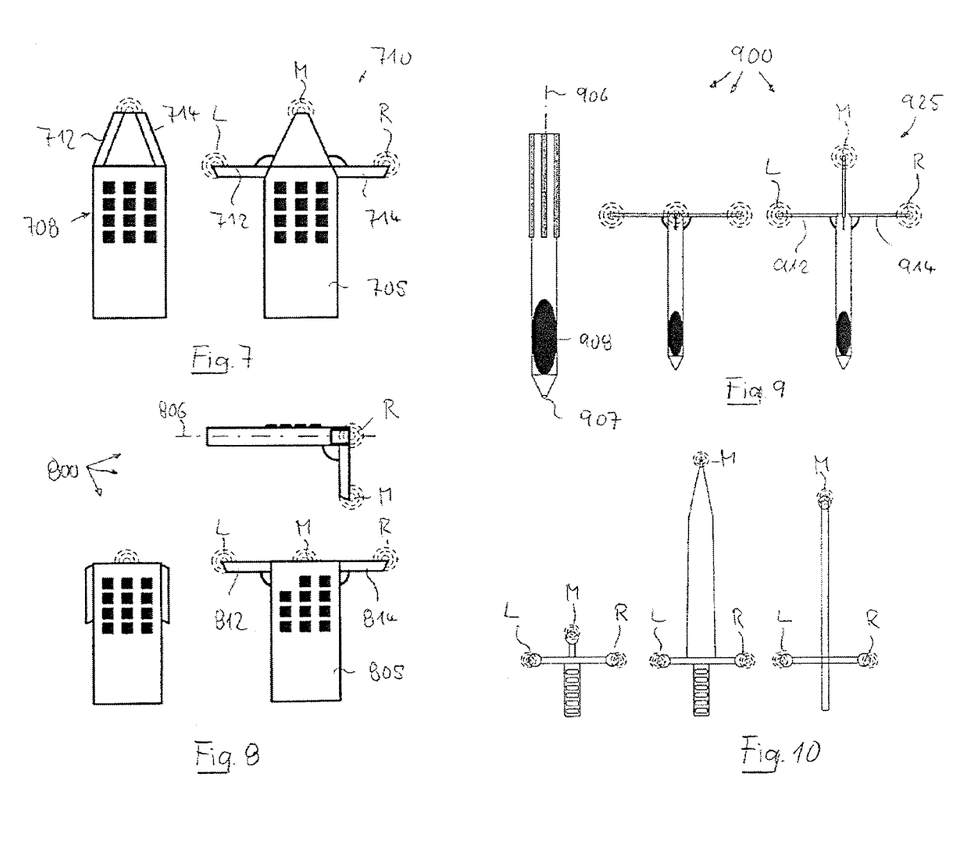
FIG. 7 shows various views of a further embodiment of an input device.
FIG. 8 shows various views of a further embodiment of an input device.
FIG. 9 shows various views of an embodiment of a pen-like input device.
FIG. 10 shows various embodiments of sword-shaped input devices for game applications.

The embodiment of the terminal 700 in FIG. 7 is constructed in the style of a remote control. Attached to the upper side of a holding section 705 is a pushbutton field 708 with several pushbuttons for controlling functions of the terminal to be controlled. The housing of the terminal is tapered in a triangular shape toward the front side and, on its flattened tip, supports the third marking M of the marking pattern 710. On each side of the triangular central section, an elongate marking support 712 and 714, respectively, is attached in a pivotable manner by means of a pivot joint. The marking supports can in this manner be pivoted between the neutral position shown on the left-hand side and the functional position shown on the right-hand side, wherein the marking supports rest against the angled side flanks of the central section in the folded-in neutral position and, in the functional position, stick out in the style of arms. The first and the second marking L and R, respectively, are attached to the outer ends of the marking supports and these markings form an isosceles triangle in the functional position, together with the fixedly installed third marking M.

The exemplary embodiment in FIG. 8 is used to show that it is also possible to attach all three markings L, R and M on movable marking supports, which can be moved, in particular be pivoted, in relation to the holding section 805 of the input device 800. From the upper sub-figure, it is possible to identify that the relatively flat holding section defines a plane 806. All three markings are attached to the outer ends of pivotable marking supports 812, 814, 816. Here, the third marking M is attached to a marking support 816 which can be pivoted out of the plane 806 toward the bottom, while the first and the second marking, which form the base of the isosceles triangle, are attached to the ends of marking supports which can be pivoted toward the outside within the plane 806.

FIG. 9 shows an example of an input device 900 which is substantially designed and dimensioned like a writing pen. A holding section 905, which is substantially cylindrical or polygonal in cross-section, has a longitudinal axis 906 and a length of between approximately 100 mm and approximately 200 mm, in particular between 120 mm and 160 mm, as measured in this direction. With a diameter of between approximately 10 mm and approximately 20 mm, the input device is designed that it is comfortable to hold. The front end is conically tapered. There, the tip 907 of an elastically resiliently mounted rod, which is coupled to a pressure sensor in the interior of the cylindrical housing, protrudes.

Situated on the rear end are three marking supports 912, 914, 916, which are mounted in a pivotable manner on the holding section and are shown in their neutral position in the left-hand sub-figure of FIG. 9, in which they extend substantially parallel to the longitudinal axis 906. Here, they can lie on the outside of the housing or be partly or wholly inserted into appropriate longitudinal slits. Each of the spring-loaded marking supports can be pivoted to the outside by means of a pivot joint attached at the rear end of the holding section and in each case carries a marking of the marking pattern 925 at its outer end. In the outwardly folded functional state (central and right-hand sub-figure), which is set automatically after actuating the trigger button 908, the markings L, R, M form an isosceles triangle. A peculiarity here consists of the fact that the first marking L and the second marking R can in each case only be pivoted as far as a direction extending perpendicular to the central longitudinal axis 906, while the marking support 914 for the third marking M can optionally be pivoted into the position which is distant perpendicular to the outside or into a position substantially parallel to the central longitudinal axis 906 (right-hand sub-figure). Thus, depending on the application situation, that spatial configuration can be set in which the markings appear in a triangular arrangement from the locations of the assigned camera.

This embodiment of an input device is useful for graphics applications in particular. The input device can, in the style of a drawing pen, be pressed onto a planar or non-planar pad by the user and can be moved in a translational manner in various directions and can be pivoted. The relative position is in each case detected by a detection system equipped with a camera module. In order to trigger an action, for example in order to generate a color area on graphics to be created, the input device is pressed onto the pad. The pressure is detected by means of the integrated pressure sensor and converted into appropriate signals, for example to let a line drawn on a screen or in the underlying digital graphics appear more or less wide. By way of example, the pen-shaped input device can be employed in conjunction with a graphics tablet.

Some options for using the invention were described in detail on the basis of exemplary embodiments. However, the use is not restricted thereto.

By way of example, a different object distribution could be provided in place of the design of the input system from FIG. 1. By way of example, the camera module could be "dumb" and merely supply unprocessed image signals. The microcontroller 400 need not be a separate component. Then the point localization (generation of the digital image data) and the calculation of digital position data would be performed by the processing unit 500. By way of example, this could be a standard version of a laptop with an installed camera above the display, in front of which a pen or another input device is moved for determining the spatial position. In this configuration, the essential calculations would be performed by a fast laptop processor, which is easily possible in the case of a dual core or multi-core processor as a result of the resource-sparing evaluation method.

Nor are the input devices restricted to the variants illustrated. Particularly in the case of applications for the games market, imaginative embodiments may be attractive. By way of example, an input device can have the shape of a sword hilt, in which a sword or the like can be virtually superimposed. An input device can also be designed as a sword or a magic wand, in which, for example, the central (third) marking can be placed along the arm (cf. FIG. 10).

The invention claimed is:

1. A method for determining a relative position of an object in space in six spatial degrees of freedom, the method comprising:
    applying a marking pattern with at least three markings on the object;
    providing an optical detection apparatus with a two-dimensional sensor surface;
    moving the object in a detection region of the optical detection apparatus in such a way that the marking pattern is detectable by the detection apparatus;
    projecting the markings onto assigned image locations on the two-dimensional sensor surface;
    establishing image coordinates of the image locations, associated with the markings, on the sensor surface;
    determining a relative position of the marking pattern by evaluating the image coordinates using an evaluation method comprising:
    selecting a first image location and a second image location, wherein the first image location is assigned to a first marking and the second image location is assigned to a second marking of the marking pattern;
    wherein a first vector between a projection center of the detection apparatus and the first image location and a second vector between the projection center and the second image location include a first angle and span a reference plane, and
    wherein a perpendicular projection of a third image location, associated with a third marking, on the reference plane defines a foot of the third marking; and
    establishing a location of a fixed point, wherein the location of the fixed point is constant, independent of the location of the projection center and the location of the foot, and a connecting straight line through the projection center and the foot always extends through the fixed point,
    wherein a reference circle is established, which extends through the first marking, the second marking and the projection center and has a center, and wherein the location of the fixed point on the reference circle is established.

2. The method as claimed in claim 1, wherein exactly three markings, arranged in a triangular arrangement, are employed for determining the relative position.

3. The method as claimed in claim 1, wherein sorting for the assignment between the image locations, present on the sensor surface, and the associated markings of the marking pattern is performed in order to select the image locations.

4. The method as claimed in claim 3, wherein the sorting is selected from the following group:
    (i) sort along at least one predetermined image direction;
    (ii) sort by movement tracking;
    (iii) permutation of possible assignments and identification of a correct assignment by checking plausibility; and
    (iv) employment of an additional fourth marking.

5. The method as claimed in claim 1, wherein the evaluation method is performed in a computer unit assigned to the detection apparatus and the computer unit is used to transmit digital position data, representing the position of the object, to a processing unit of a terminal to be controlled for further processing purposes.

6. An optical input system for generating digital position data, which represent the relative position of the input device in space in six spatial degrees of freedom relative to an optical detection apparatus, the optical input system comprising:
    a hand-held input device, on which a marking pattern with a first marking, a second marking and a third marking is applied;
    an optical detection apparatus with a two-dimensional sensor surface and a projection optical unit, which, in relation to the sensor surface, is arranged in such a way that image information from a detection region of the detection apparatus is projectable onto the sensor surface; and a computer unit for determining the digital position data, wherein the computer unit is configured to perform the method as claimed in claim 1.

7. The optical input system as claimed in claim 6, wherein the computer unit is assigned to the detection apparatus in such a way that the digital position data, generated by the computer unit, is transmitted to a processing unit of a terminal to be controlled for further processing purposes.

8. The optical input system as claimed in claim 6, wherein the marking pattern has exactly three markings or exactly four markings, and the markings are identical in terms of properties thereof.

9. The optical input system as claimed in claim 8, wherein the markings are identical in terms of color, shape and size.

10. The optical input system as claimed in claim 6, wherein the first marking, the second marking and the third marking of the marking pattern form an isosceles triangle.

11. The optical input system as claimed in claim 10, wherein base angles of the isosceles triangle are between 20° and 70°.

12. The optical input system as claimed in claim 10, wherein a fourth marking is provided, and the fourth marking lies in a line with the first marking and the second marking.

13. The optical input system as claimed in claim 12, wherein the first marking, the second marking and the fourth marking are distributed non-uniformly along the line.

14. The optical input system as claimed in claim 6, wherein the input device further comprises at least one sensor, which is selected from the group consisting of an accelerometer, a rate-of-rotation sensor and a magnetic field sensor.

15. The optical input system as claimed in claim 6, wherein the input device further comprises a pressure sensor for determining a contact pressure of the input device on a contact surface.

16. The optical input system as claimed in claim 6, wherein:
   the input device further comprises a holding section and at least one marking support,
   the at least one marking support is movable in relation to the holding section and is movable between a neutral position and a functional position,
   the at least one marking support is attached to the input device, and
   a marking carried by the marking support has a correct location relative to other markings of the marking pattern in the functional position.

17. The optical input system as claimed in claim 6, wherein the detection apparatus is exactly one camera, and wherein the marking pattern has exactly three markings or exactly four markings.

\* \* \* \* \*